(12) United States Patent
Shaw et al.

(10) Patent No.: US 8,594,635 B2
(45) Date of Patent: Nov. 26, 2013

(54) CLIENT MANAGEMENT OF VISUAL VOICEMAIL DATA COMMUNICATIONS

(71) Applicant: AT&T Mobility II LLC, Atlanta, GA (US)

(72) Inventors: Venson M. Shaw, Kirkland, WA (US); Arthur Brisebois, Cumming, GA (US); Gholam-Reza Rahsaz, Sammamish, WA (US); William Sigmund, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/795,031

(22) Filed: Mar. 12, 2013

(65) Prior Publication Data

US 2013/0196635 A1 Aug. 1, 2013

Related U.S. Application Data

(63) Continuation of application No. 12/621,828, filed on Nov. 19, 2009, now Pat. No. 8,406,744.

(51) Int. Cl.
*H04M 11/10* (2006.01)

(52) U.S. Cl.
USPC ............. 455/413; 455/412.1; 455/412.2; 379/88.12; 379/88.25

(58) Field of Classification Search
USPC ............. 455/412.1, 412.2, 413; 379/88.12, 379/88.14, 88.25, 142.01, 142.17; 348/14.06
See application file for complete search history.

(56) References Cited

U.S. PATENT DOCUMENTS

| | | | |
|---|---|---|---|
| 5,333,272 A | 7/1994 | Capek et al. | |
| 8,406,744 B2 | 3/2013 | Shaw et al. | |
| 2003/0020750 A1 | 1/2003 | Brown et al. | |
| 2006/0215637 A1 | 9/2006 | Fukazawa et al. | |
| 2008/0062968 A1* | 3/2008 | Takahashi et al. | 370/352 |
| 2010/0131656 A1 | 5/2010 | Tsym | |
| 2010/0151834 A1* | 6/2010 | Kalbag | 455/413 |
| 2011/0143721 A1 | 6/2011 | Raphael et al. | |

* cited by examiner

*Primary Examiner* — Kashif Siddiqui
*Assistant Examiner* — Marisol Fahnert
(74) *Attorney, Agent, or Firm* — Woodcock Washburn LLP

(57) ABSTRACT

Data communications sessions for visual voicemail data communications are terminated under the control of a wireless device's visual voicemail client. In one embodiment, a visual voicemail client can be configured to transmit a request or command to terminate a data communications session immediately upon sending an acknowledgement of receiving voicemail data from a voicemail server. In another embodiment, a visual voicemail client can be configured to transmit a request or command to terminate a data communications session following the expiration of a timer set by the visual voicemail client. Alternatively, a visual voicemail client can be configured to wait for a termination request for command from a voicemail server.

20 Claims, 10 Drawing Sheets

CLIENT MANAGEMENT OF VISUAL VOICEMAIL DATA COMMUNICATIONS

CROSS-REFERENCE TO RELATED APPLICATIONS

This application is a continuation of, and claims priority to, U.S. patent application Ser. No. 12/621,828, filed Nov. 19, 2009, entitled "Client Management of Visual Voicemail Data Communications," the entire contents of which are hereby incorporated herein by reference.

TECHNICAL FIELD

The technical field generally relates to wireless communications and more specifically relates to client management of visual voicemail data communications sessions.

BACKGROUND

Communications devices such as cellular telephones, mobile communication devices, personal digital assistants (PDAs), laptops, and the like are becoming more prevalent as technology advances and makes these devices more powerful and more affordable. These devices are also being constructed with increasing capabilities and can now perform functions that have in the past been performed by dedicated special function communications devices. For instance, a common mobile communications device today may have computing capabilities, the ability to communicate with data networks such as the internet, a display than can render high quality still images and video, audio capabilities that allow the device to play music and video soundtracks, as well as the ability to place and receive traditional mobile telephone calls and text messages.

The expanding capabilities of mobile communications devices have allowed the improvement and enhancement of more traditional technologies. For example, voicemail has traditionally been an audio-only feature that requires a telephone connection to a voicemail server. A user would receive a message waiting notification that a voicemail is available, and the user would then have to dial into a voicemail server to listen to the message. Thanks to technological advances, visual voicemail is available on many mobile communications devices. Visual voicemail presents a visual interface to a user's voicemail box and allows the user to view attributes of voicemail and manipulate voicemail in various ways that were previously not possible. A user may delete or save voicemail through the visual interface without having to place a telephone call to a voicemail server. A user may also be able to see who the voicemail is from, when it was sent or received, and other characteristic of the voicemail without actually placing a telephone call to a voicemail server.

Current visual voicemail services are typically implemented by requesting and establishing a session between a user device and a device in a wireless provider network. When viewed in light of the Open System Interconnection Reference Model ("OSI Model") communication between a visual voicemail client and a device in a wireless provider network may occur at the application layer using a communications session established at the transport layer, such as a transmission control protocol (TCP) session. For example, a packet data protocol (PDP) context may be activated for a user device by the operating system of the user device. This establishes communications configurations, such as an Internet protocol (IP) address, tunnel identifications, etc., that may be necessary or desired in order to set up a data communications session. PDP contexts may be established on a variety of network devices, including a radio network controller (RNC). Such devices may be configured or capable of maintaining a limited number of PDP contexts, and may be capable of establishing a limited number of PDP context in a set period of time.

Once a PDP context is established, a data communications session, such as TCP session, may be established between an application running on the user device and a network device, such as a voicemail server. Once a session is established, a voicemail server may communicate with a user device at the application layer and transmit voicemail data to a user device. The user device may then transmit an acknowledgement to the voicemail server. Next, the voicemail server will typically set a timer and wait for a period of time, maintaining the data session in case the user device requires any additional activities or data from the voicemail server. If no further activities are requested, the voicemail server will then transmit a request to close the data communications session. However, because the PDP context and the communications session between the user device and the voicemail server occur at different layers of the OSI Model, the user device may determine that the PDP context is no longer needed, for example when a timer expires, and request the PDP context be deactivated even though further communication may be needed between the user device's voicemail client and the voicemail server.

There are several drawbacks to the current methods of providing visual voicemail services. Because the user devices may vary in configuration and design and may not coordinate PDP context use between a voicemail client and an operating system, a user device operating system may close a PDP context before the voicemail client application closes the data communications session with the voicemail server. This may result in the voicemail server maintaining the data communications session unnecessarily while waiting for a timer to timeout, thus wasting server resources. This may also result in the reestablishment of the PDP context in the event that further voicemail activities are needed by the voicemail server or the user device, thus unnecessarily wasting resources on an RNC or other device configured to establish and maintain PDP contexts. It is often less resource intensive to maintain a PDP context than it is to deactivate and reactivate a PDP context, and an RNC or other device configured to establish and maintain PDP contexts may have a limited capability to establish and maintain those contexts. The current methods also require that the voicemail server terminate data communications sessions. Thus, if the user device has closed a PDP context activated for the transfer of voicemail data, the voicemail server or user device will have to reactivate the PDP context just to send a request to the user device close the data communications session. This results in unnecessary utilization of network, mobile device, and server resources.

SUMMARY

Visual voicemail clients may be configured on wireless devices with various priorities and resource management schemes. In one embodiment, clients with a high priority on preserving resources and limiting resource utilization may be configured to terminate a data communications session upon receiving and acknowledging voicemail data received from a voicemail server. In another embodiment, where a client may be configured to allow some flexibility while reducing the use of resources, the client may set a timer upon receipt of voicemail data from a voicemail server, and wait for further activities to be requested. If further activities are requested, the timer may be reset. Upon expiration of the timer, the client may transmit a command or request to terminate a session to the voicemail server. In another embodiment, a client may be configured to maximize voicemail activities and therefore wait on the voicemail server to terminate the communications sessions. These and additional aspects of the current disclosure are set forth in more detail below.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
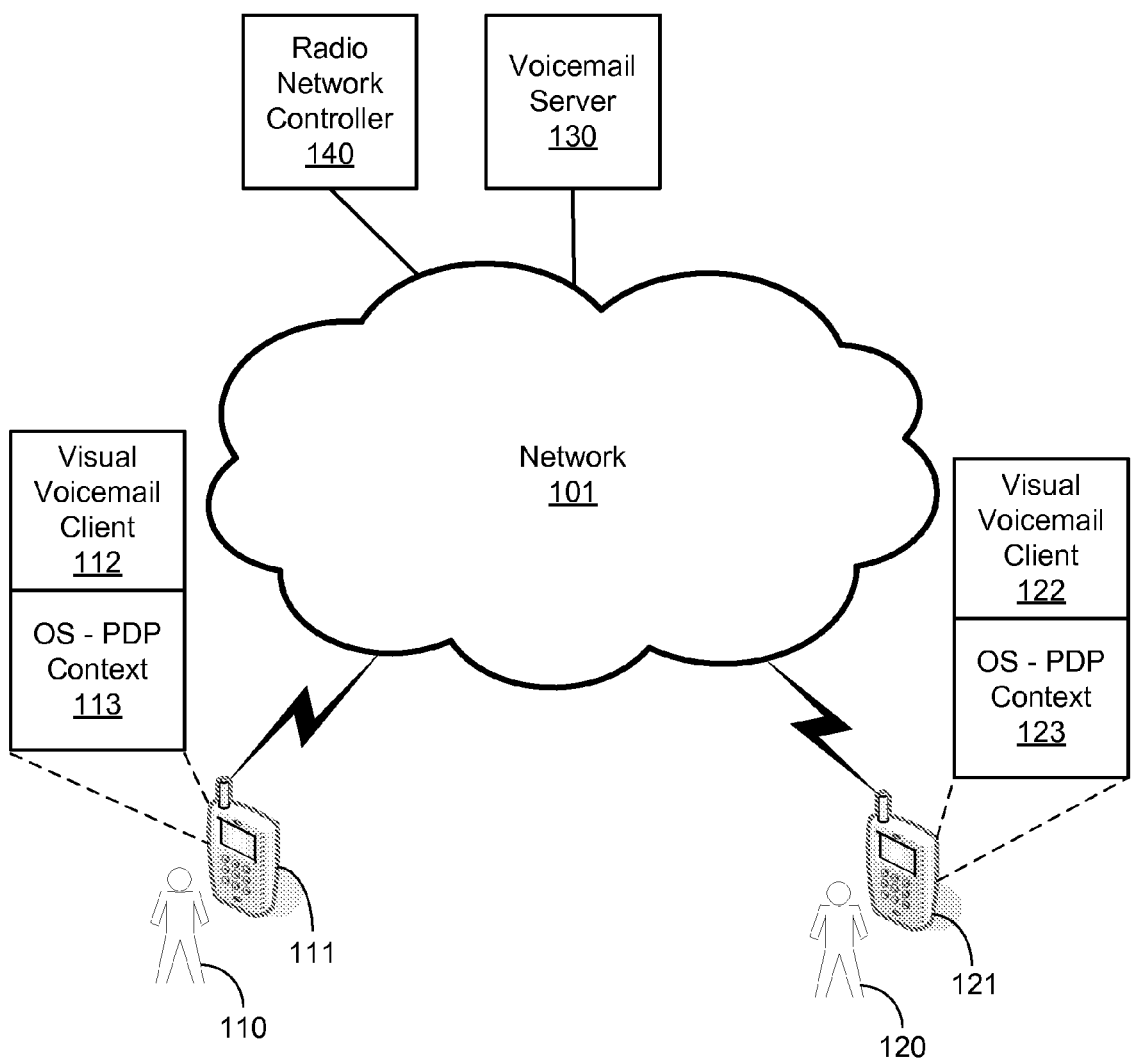
FIG. 1 is a block diagram of a non-limiting, exemplary network environment in which client management of visual voicemail data communications may be implemented.

FIG. 1 illustrates a network environment in which one or more embodiments of a visual voicemail system may be implemented. User 110 may operate wireless device 111, and user 120 may operate wireless device 121. Each of wireless devices 111 and 121 may be any type of wireless mobile communications device, including a mobile telephone, smart phone, personal data assistant (PDA), mobile computer, wireless email device, or any combination thereof. Alternatively, while wireless devices 111 and 121 as illustrated represent wireless mobile communications devices, wireless devices 111 and 121 may also represent a wired device, such as a landline telephone, computer, email device, or any other communications device or any combination thereof. All such embodiments are contemplated as within the scope of the present disclosure.

Wireless devices 111 and 121 may communicate with network 101. Network 101 may be any type of network capable of providing wireless services to wireless devices of any type. Network 101 represents any number of interconnected networks that may be composed of any number and type of wired and/or wireless network devices. Network 101 may enable wireless devices 111 and 121 to communicate with each and with other mobile devices. Additionally, network 101 may enable wireless devices 111 and 121 to communicate with computing devices such as voicemail server 130 and other servers accessible via network 101 such as web servers. Such communication may be voice, data, or a combination thereof. All such embodiments are contemplated as within the scope of the present disclosure.

User 110 may wish to call user 120 by operating wireless device 111. Upon dialing the phone number associated with wireless device 121, user 110 may be connected to a voicemail system that allows user 110 to create a voicemail for user 120. This may be because user 120 fails to answer the call placed by user 110, or because wireless device 121 is unavailable for some reason, such as being located in an area with no wireless network coverage, or being shut off. In an alternative embodiment, user 110 may initiate a voicemail unprompted, or may be responding to a voicemail created by user 120. Alternatively, user 110 may wish to send a voicemail to user 120 without directly calling wireless device 121, and may interact with a voicemail system to create and send the voicemail to user 120.

In one embodiment, such interaction may be performed through the use of visual voicemail client 112, which may be any software, hardware, or combination of software and hardware configured to allow user 110 to interact with a visual voicemail system by operating wireless device 111. Such software may be configured to interact with voicemail server 130 and/or related systems or components. Alternatively, such software may perform some or all of the processing required to gather the information for generating a voicemail. In another alternative, no specialized visual voicemail client may be configured on wireless device 111, and all necessary voicemail data gathering may be accomplished through wireless device 121 by voicemail server 130 and/or related systems or components. In such a system, the visual voicemail interface presented to user 110 may be web-based, and may be presented within a webpage displayed on wireless device 111 using appropriate software such as a web browser.

In order to communicate with network 101, operating system 113 of wireless device 111 may request activation by network 101 of a PDP context. Such a request may be transmitted to a device such as radio network controller (RNC) 140. This request may enable network layer (of the OSI Model) communications between wireless device 111 and network 101. Once a PDP context is activated, visual voicemail client 112 may establish a transport layer (of the OSI Model) communications session and, in some embodiments, higher layer sessions to communicate at the application layer (of the OSI Model) with voicemail server 130 and/or related systems or components. In one embodiment, visual voicemail client 112 may communicate with operating system 113 to inform operating system 113 of the status of visual voicemail client 112. For instance, visual voicemail client 112 may inform operating system 113 when the communications session between visual voicemail client 112 and voicemail server 130 is terminated. Operating system 113 may be configured to maintain, or to not request deactivation, of the established PDP context until it is informed by visual voicemail client 112 that the communications session between visual voicemail client 112 and voicemail server 130 is terminated.

In one embodiment, an exemplary voicemail system may be operated, at least in part, by voicemail server 130, which may be associated with a network that provides wireless communications services to either or both user 110 and user 120. Alternatively, voicemail server 130 may be owned, operated, or maintained by a third party, and may be a component of a third party system that provides voicemail services to the operator of network 101 or any other network operator. Voicemail server 130 may be any one or more computing devices and/or software capable of performing voicemail functions as described herein. Voicemail server 130 may be dedicated to performing voicemail functions, or may be a component of a device or system that performs other functions in addition to voicemail functions.

Upon communicating with voicemail server 130, user 110 may be provided with aural prompts that allows user 110 to interact with voicemail server 130. Voicemail server 130 may solicit and store an audible voice message portion of a voicemail from user 110 using traditional telephony means. Voicemail server 130 may also prompt user 110 to attach or associate multimedia content with the voicemail, and may obtain and associate such content with the voicemail. Voicemail server 130 may also acquire or obtain through various means other information, either automatically or by prompting user 110 for such information, that may be associated with or assist in generating content for the voicemail. Note that any or all of the above-listed actions performed by voicemail server 130 may instead, or also, be performed by the recipient's wireless device, such as wireless device 121. Once all information needed has been gathered by voicemail server 130 and the interaction with user 110 is complete, voicemail server 130 and/or related components or systems may generate and transmit a notification and/or other data that a new voicemail is available.

Such a notification may be received on wireless device 121 and may be presented to user 120, in one embodiment through the use of visual voicemail client 122, which may be software, hardware, or a combination of software and hardware that presents a visual voicemail interface on a display of wireless device 121 and/or otherwise allows user 120 to interact with a visual voicemail system by operating wireless device 121. Such software may be configured to interact with voicemail server 130 and/or related systems or components. Such software may function merely as a front end, with all processing of voicemail and related data performed by voicemail server 130 and/or related systems or components. Alternatively, such software may perform some or all of the processing required to present the visual voicemail interface. In another alternative, no specialized visual voicemail software may be configured on wireless device 121, and all necessary voicemail presentation data may be transmitted to wireless device 121 by voicemail server 130 and/or related systems or components. In such a system, the visual voicemail interface presented to user 120 may be web-based, and may be presented within a webpage displayed on wireless device 121 using appropriate software such as a web browser. All other alternate configurations and combinations thereof are contemplated as within the scope of the present disclosure.

As with wireless device 111, in order to communicate with network 101, operating system 123 of wireless device 121 may request activation by network 101 of a PDP context in order to allow visual voicemail client 122 to communicate with voicemail server 130 or other voicemail servers or systems. Such a request may be transmitted to a device such as radio network controller (RNC) 140. This request may enable network layer (of the OSI Model) communications between wireless device 121 and network 101. Once a PDP context is activated, visual voicemail client 122 may establish a transport layer (of the OSI Model) communications session and, in some embodiments, higher layer sessions to communicate at the application layer (of the OSI Model) with voicemail server 130 and/or other voicemail systems or components. In one embodiment, visual voicemail client 122 may communicate with operating system 123 to inform operating system 123 of the status of visual voicemail client 122. For instance, visual voicemail client 122 may inform operating system 123 when the communications session between visual voicemail client 122 and voicemail server 130 is terminated. Operating system 123 may be configured to maintain, or to not request deactivation, of the established PDP context until it is informed by visual voicemail client 122 that the communications session between visual voicemail client 122 and voicemail server 130 is terminated.

Figure 2:
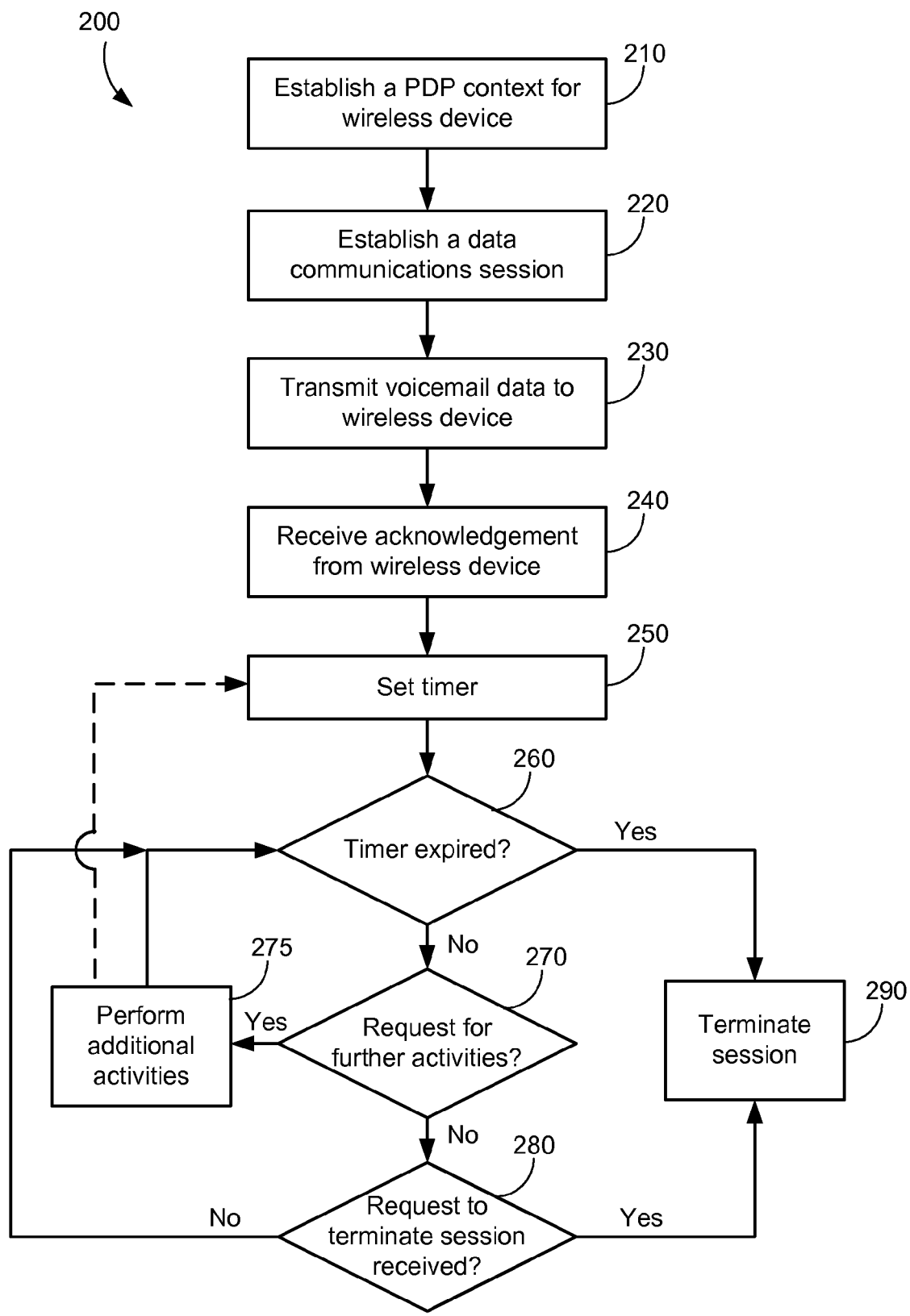
FIG. 2 illustrates a non-limiting exemplary method of implementing client management of visual voicemail data communications.

More specifically, method 200 of establishing and terminating a data communications session for communicating voicemail data according to the present disclosure is illustrated in FIG. 2. Method 200 may be performed by one or more voicemail servers and/or other network devices that communicate with one or more end-user operated wireless devices to provide voicemail data to the one or more wireless devices. Such network devices may include one or more RNCs, Serving GPRS Support Nodes (SGSNs) and/or Gateway GPRS Support Nodes (GGSNs). At block 210, a packet data protocol (PDP) context may be established. This may be due to a request received from a wireless device on a device such as an RNC to establish such a context, or the context establishment may be initiated by a network device. Such a request may originate at the operating system of a wireless device. In many embodiments, the data structure containing PDP context data may be stored at an RNC, SGSN and/or a GGSN, but in other embodiments, such context data may be stored at one or more alternate devices. In one embodiment, the establishment of a PDP context provides the configuration data necessary to allow a wireless device to communicate with a packet data network of a wireless provider at the network layer. For example, the PDP context may include a network address for the wireless device, such as an IP address, the international mobile subscriber identity (IMSI) for the wireless device, tunnel endpoint identifiers, and any other data that may facilitate packet data communications between a wireless device and a packet data network.

At block 220, a data communications session may be established, in one embodiment, between a voicemail server and a voicemail client on a wireless device. For example, once network configuration data is established for a wireless device at block 210, such data may be used by the wireless device to request the establishment of a transmission control protocol (TCP) session between the wireless device and a voicemail server across a packet data network at the transport layer. Alternatively, for example when new voicemail data is available on a voicemail server for a wireless device, the voicemail server may send a request to establish a TCP session to the wireless device. Other protocols other than TCP may be used, and other devices may be involved in requesting and/or establishing a data communications session. Additionally, communications may take place between a voicemail server and a voicemail client on a wireless device at the session, presentation, and/or application layers. All such embodiments are contemplated as within the scope of the present disclosure.

At block 230, voicemail data may be transmitted to the wireless device. Such data may include data relating to the content of the voicemail, such as the voicemail sender's name, telephone number, and/or other identifying data, the time and date when the voicemail was created, etc. Such data may also include visual voicemail related data, such as categorizations of the voicemail, location data for the voicemail sender, address book information, or any other data or information that may be useful to a visual voicemail system. Any other data is also contemplated. Voicemail data may be intended for and received by a visual voicemail client on the wireless device, and may be presented to a user of the wireless device through the operation of such a client. Alternatively, the voicemail data may be received and/or manipulated by other hardware and/or software elements of the wireless device.

At block 240, an acknowledgement from the wireless device may be received indicating that the wireless device successfully received the voicemail data transmitted at block 230. Such an acknowledgement may be transmitted from a visual voicemail client of the wireless device. Alternatively, an indication that some or all of the voicemail data was not transmitted successfully may be received at block 240, in which case the voicemail server or network device that transmitted the voicemail data may retransmit such data.

In some embodiments, at block 250, a timer may be set. This timer may be used by a voicemail server or other network device to determine when to initiate the termination of the data communications session with the wireless device. A network device providing voicemail data to a user's wireless device may be configured to maintain a data communications session with the wireless device for a period of time following the acknowledgment of successful receipt of such data by the wireless device. In some embodiments, such a configuration is in place to allow the user's wireless device to request further data or the performance of further voicemail related activities.

At block 260, a determination is made as to whether the timer set at block 250 has expired. If it has expired, then at block 290, the data communications session between the voicemail server or network device and the wireless device is terminated. This may be accomplished in any effective manner, such as sending a FIN command to the wireless device in order to terminate a TCP session. Alternative methods of terminating a session and terminating sessions using other protocols are contemplated as within the scope of the present disclosure.

At block 270, a determination is made as to whether a request for further activities has been received. Such a request may include a request for additional data, a request to perform an action such as delete, modify, and/or save a voicemail, or a request for any other activity. If further activity is requested, at block 275 such activities are performed, and continued determinations are made at block 260. In some embodiments, the method may instead return to block 250 and reset the timer before performing further determinations at blocks 260, 270, and 280.

At block 280, a determination is made as to whether a request to terminate the data communications session has been received from a user's wireless device. If such a request has been received, the session is terminated at block 290. This may be in response to receiving an indication such as a FIN command from the wireless device in order to terminate a TCP session. Alternatively, a request to terminate a session received from a wireless device may result in the network device transmitting a session terminating request such as a FIN command to the wireless device. Any other method and means of terminating a data communication session, or requesting such a termination, is contemplated as within the scope of the present disclosure. It should be noted that the determination performed at block 260, 270, and 280, may be performed in any order and the order presented in FIG. 2 should not be construed to imply any order of performing the actions disclosed at these blocks. At block 290, a request may also be received at an RNC or any other network device configured to establish and/or maintain PDP contexts to deactivate the established PDP context.

Various wireless devices may host and operate various visual voicemail clients, and such devices and clients may be configured in various manners. Such devices and clients may have different requirements which may affect how such devices and clients manage data communications sessions. For illustrative purposes only, such devices and clients may be categorized into three categories, shown in Table 1 below. Note that the listed categories are only provided for exemplary purposes, and wireless devices, visual voicemail clients, and their respective configurations may vary. All such devices and visual voicemail clients are contemplated as within the scope of the present disclosure.

TABLE 1

Visual voicemail device/client categories

| | Type A Device/Client | Type B Device/Client | Type C Device/Client |
|---|---|---|---|
| Resource priority | Maximize power savings and reduction of resource utilization | Support additional activities while conserving power and resources | Provide maximum support for additional activities, or not capable of terminating session |
| Session management strategy | Terminate data communications session as soon as possible | Terminate data communications session after brief time of inactivity | Terminate data communications upon receipt of command to do so from network device |

Figure 3:
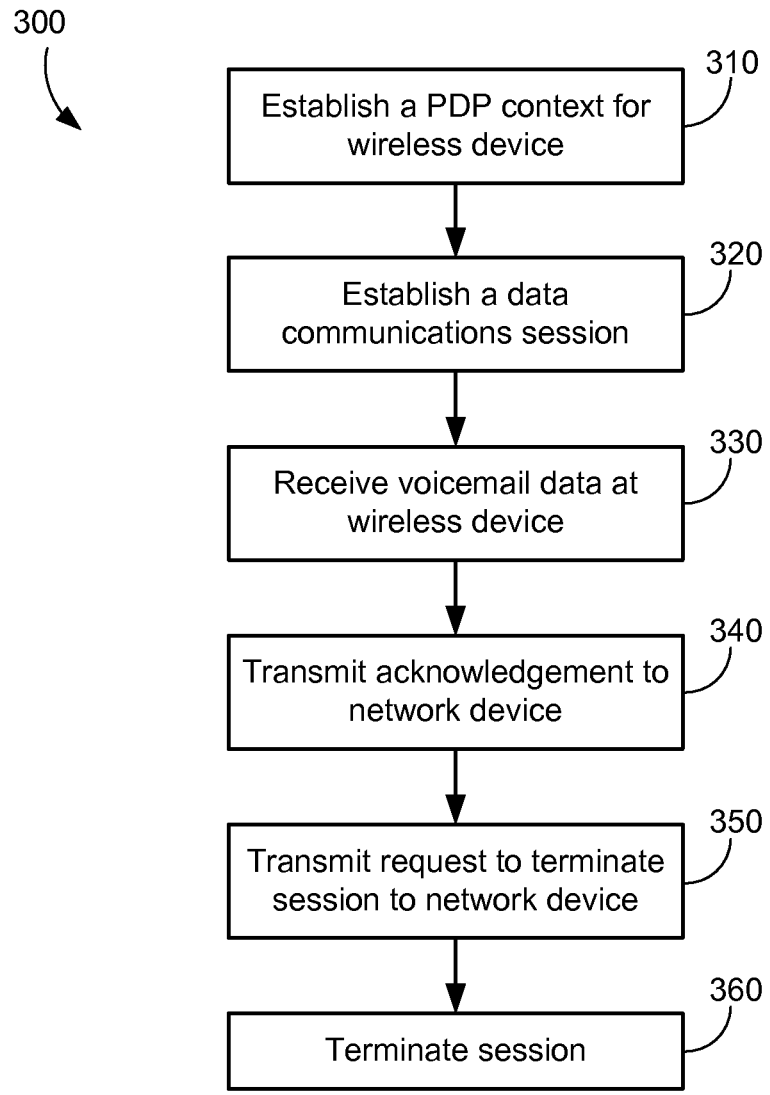
FIG. 3 illustrates another non-limiting exemplary method of implementing client management of visual voicemail data communications.

Method 300 of establishing and terminating a data communications session for communicating voicemail data according to the present disclosure for a Type A device or client is illustrated in FIG. 3. Method 300 may be performed by a visual voicemail client or other software and/or hardware component of a wireless device, including in conjunction with an operating system of a wireless device. Such a client and/or device may communicate with network devices such as RNCs, SGSNs, GGSNs, and/or voicemail servers. At block 310, a PDP context may be established. This may be due to a request transmitted from the operating system of a wireless device to establish such a context, in one embodiment in response to detecting the activation of a voicemail client my the operating system, or the context establishment may be initiated by a network device. Such a request may be transmitted to an RNC, SGSN, GGSN or other device configured to perform PDP context tasks. As mentioned above, the data structure containing PDP context data may be stored at an RNC, SGSN and/or a GGSN, but in other embodiments, such context data may be stored at one or more alternate devices. In one embodiment, the establishment of a PDP context provides the configuration data necessary to allow the wireless device to communicate with a packet data network of a wireless provider at the network layer. For example, the PDP context may include a network address for the wireless device, such as an IP address, the international mobile subscriber identity (IMSI) for the wireless device, tunnel endpoint identifiers, and any other data that may facilitate packet data communications between a wireless device and a packet data network. Some or all of such data may be received on the wireless device and used by an operating system and/or a visual voicemail client configured on the wireless device in order to communication with a voicemail server.

At block 320, a data communications session may be established, in one embodiment, between a voicemail server and the wireless device for communication at the transport layer. For example, once network configuration data is established for a wireless device at block 310, such data may be used by the wireless device to request the establishment of a transmission control protocol (TCP) session between the wireless device and a voicemail server across a packet data network. Alternatively, for example when new voicemail data is available on a voicemail server for a wireless device, the voicemail server may send a request to establish a TCP session to the wireless device. Other protocols other than TCP may be used, and other devices may be involved in requesting and/or establishing a data communications session. All such embodiments are contemplated as within the scope of the present disclosure.

At block 330, voicemail data may be received at the wireless device. Such data may include data relating to the content of the voicemail, such as the voicemail sender's name, telephone number, and/or other identifying data, the time and date when the voicemail was created, etc. Such data may also include visual voicemail related data, such as categorizations of the voicemail, location data for the voicemail sender, address book information, or any other data or information that may be useful to a visual voicemail system. Any other data is also contemplated. Voicemail data may be intended for and received by a visual voicemail client on the wireless device, and may be presented to a user of the wireless device through the operation of such a client. Alternatively, the voicemail data may be received and/or manipulated by other hardware and/or software elements of the wireless device.

At block 340, an acknowledgement may be transmitted from the wireless device indicating that the wireless device successfully received the voicemail data transmitted at block 330. Such an acknowledgement may be transmitted from a visual voicemail client of the wireless device. Alternatively, an indication that some or all of the voicemail data was not received successfully may be transmitted at block 340, in which case the voicemail server or network device that transmitted the voicemail data may retransmit such data.

Following the receipt of the voicemail data, the Type A device or client may transmit a request to terminate the data communications session at block 350. This may be done immediately after acknowledging receipt of the voicemail data, or in conjunction with the acknowledgement of receipt of the voicemail data. Alternatively, the Type A wireless device or client may request further activities or data, and then transmit a request to terminate the data communications session. The relatively immediate termination of the data communications session may assist in conserving power and resources on a Type A wireless device, as well as on network devices. In some embodiments, the request to terminate the data communications session may take the form of transmitting a FIN command to the voicemail server and/or a network device to terminate a TCP session. Alternatively, the request may take the form of a request for the voicemail server or network device to transmit a FIN command to the wireless device to terminate a TCP session. Other protocols and means of requesting termination of a data communications session may be used, and all such implementations are contemplated. At block 360, the session may be terminated. Note that at either blocks 350 or 360, the Type A wireless device may also send a request to an RNC, SGSN, GGSN, or any other PDP context device that any open PDP context be closed. The request may be communicated to the operating system of the Type A wireless device which may be configured to handle PDP context requests for activation and deactivation. Alternatively, the operating system of the Type A device may detect the request to close the transport layer communication session, the termination of the voicemail client application, or any other activity of the voicemail client that indicates that further voicemail communications are not needed. The operating system of the Type A device may then transmit the request to a network device. Such a request may be transmitted to a device separate from a voicemail server or network device that handles voicemail data, such as an RNC, SGSN or GGSN.

Figure 4:
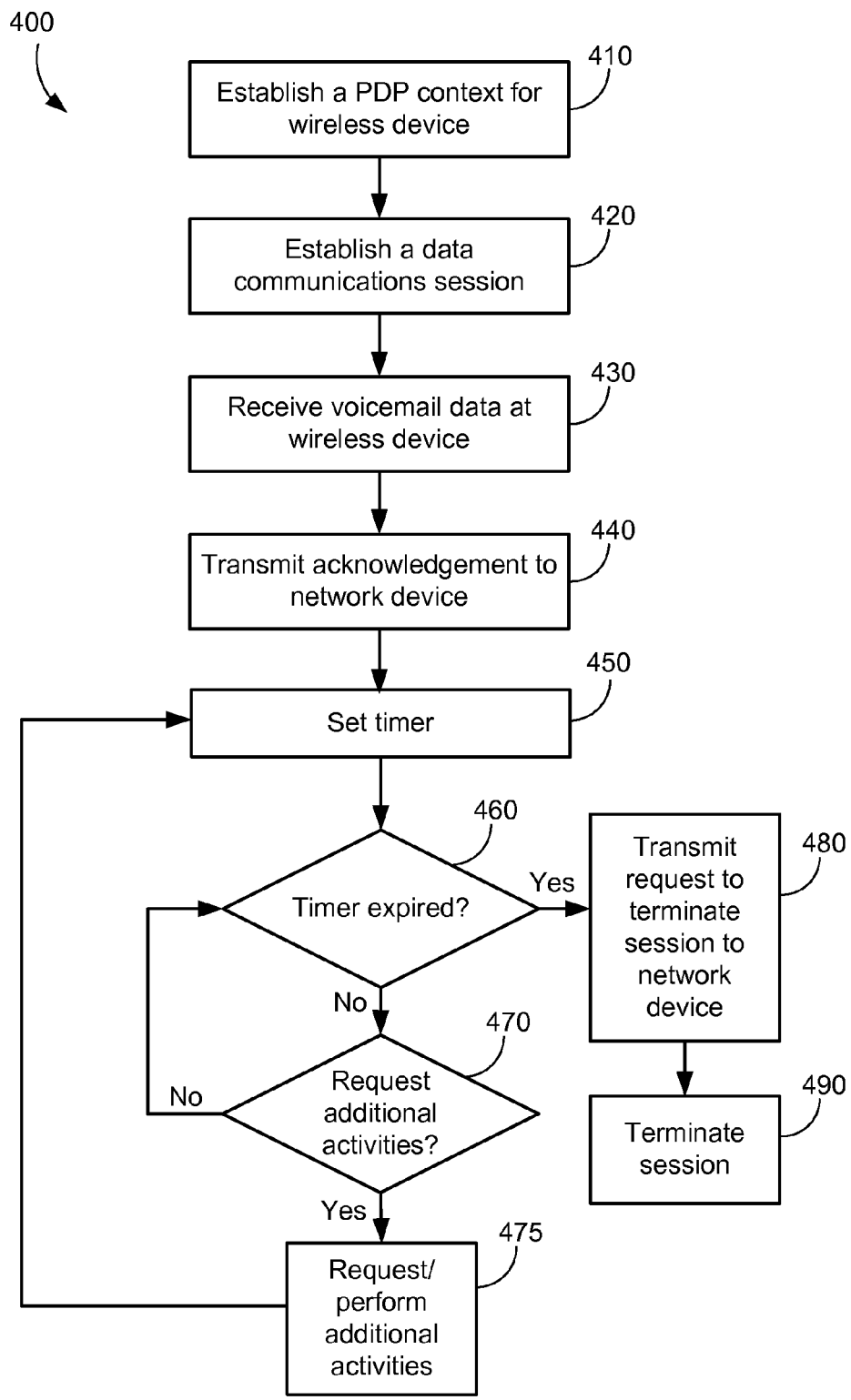
FIG. 4 illustrates another non-limiting exemplary method of implementing client management of visual voicemail data communications.

Method 400 of establishing and terminating a data communications session for communicating voicemail data according to the present disclosure for a Type B device or client is illustrated in FIG. 4. As with method 300, method 400 may be performed by a visual voicemail client working in conjunction with a Type B device's operating system or other software and/or hardware component of a wireless device. Such a client may communication with network devices such as RNCs, SGSNs, GGSNs, and/or voicemail servers. At block 410, a PDP context may be established. Here again, this may be due to a request transmitted from the operating system of a Type B wireless device to establish such a context, or the context establishment may be initiated by a network device. Such a request may be sent to an RNC, SGSN, GGSN, or any other device configured to perform PDP context tasks. In one embodiment, the PDP context establishment request is transmitted due to the operating system of the Type B device detecting the activation of a voicemail client. The data structure containing PDP context data may be stored on any device and may contain any information as described herein with regard to FIGS. 2 and 3.

At block 420, a data communications session may be established at the transport layer, in one embodiment, between a voicemail server and the wireless device, and other communications sessions at other layers may also be established. For example, once network configuration data is established for a wireless device at block 410, such data may be used by the wireless device to request the establishment of a transmission control protocol (TCP) session between the wireless device and a voicemail 1 server across a packet data network. Alternatively, for example when new voicemail data is available on a voicemail server for a wireless device, the voicemail server may send a request to establish a TCP session to the wireless device. Other protocols other than TCP may be used, and other devices may be involved in requesting and/or establishing a data communications session. All such embodiments are contemplated as within the scope of the present disclosure.

At block 430, voicemail data may be received at the wireless device. Such data may include any of the voicemail data described herein, including such data as disclosed in regard to FIGS. 2 and 3, and may be received and/or manipulated by any hardware and/or software elements of the wireless device.

At block 440, an acknowledgement may be transmitted from the wireless device indicating that the wireless device successfully received the voicemail data transmitted at block 430. Such an acknowledgement may be transmitted from a visual voicemail client of the wireless device. Alternatively, an indication that some or all of the voicemail data was not received successfully may be transmitted at block 440, in which case the voicemail server or network device that transmitted the voicemail data may retransmit such data.

Following the receipt of the voicemail data, the Type B device or client may set a timer at block 450. This timer may allow the Type B device or client to perform or request additional activities such as those additional activities described in regard to FIG. 2. The timer may be set for a shorter amount of time than any inactivity timer set by a voicemail server or network device with which the Type B device has established a data communications session. This may allow for quicker release of resources and lower power and resource utilization than the default timer used by the voicemail server or network device, but still allow time for performing or requesting additional activities.

At block 460, a determination is made by the Type B device or client as to whether the timer has expired. If the timer has not expired, at block 470 a determination is made as to whether additional activities have been or are to be requested or performed. If additional activities are to be performed or requested, the activities are performed or requested at block 475, and the method may return to block 450 to reset the timer. Such additional activities may be any additional activities as described herein. If no additional activities are requested or performed, the time is evaluated again at block 460.

If, at block 460, the determination is made by the Type B device or client that the timer has expired, then at block 480 the Type B device or client may transmit a request to terminate the data communications session. In some embodiments, the request to terminate the data communications session may take the form of transmitting a FIN command to the voicemail server and/or a network device to terminate a TCP session. Alternatively, the request may take the form of a request for the voicemail server or network device to transmit a FIN command to the wireless device to terminate a TCP session. Other protocols and means of requesting termination of a data communications session may be used, and all such implementations are contemplated. At block 490, the session may be terminated.

Note that at either blocks 480 or 490, the Type B wireless device may also request that any open PDP context be closed. Such a request may be sent to an RNC, SGSN, GGSN, or any other device configured to perform PDP context tasks. The request may be communicated to the operating system of the Type B wireless device which may be configured to handle PDP context requests for activation and deactivation. Alternatively, the operating system of the Type B device may detect the request to close the transport layer communication session or any other communication session, the termination of the voicemail client application, or any other activity of the voicemail client that indicates that further voicemail communications are not needed. The operating system of the Type B device may then transmit the request to deactivate the PDP context to a network device. Such a request may be transmitted to a device separate from a voicemail server or network device that handles voicemail data, such as SGSN or GGSN.

Figure 5:
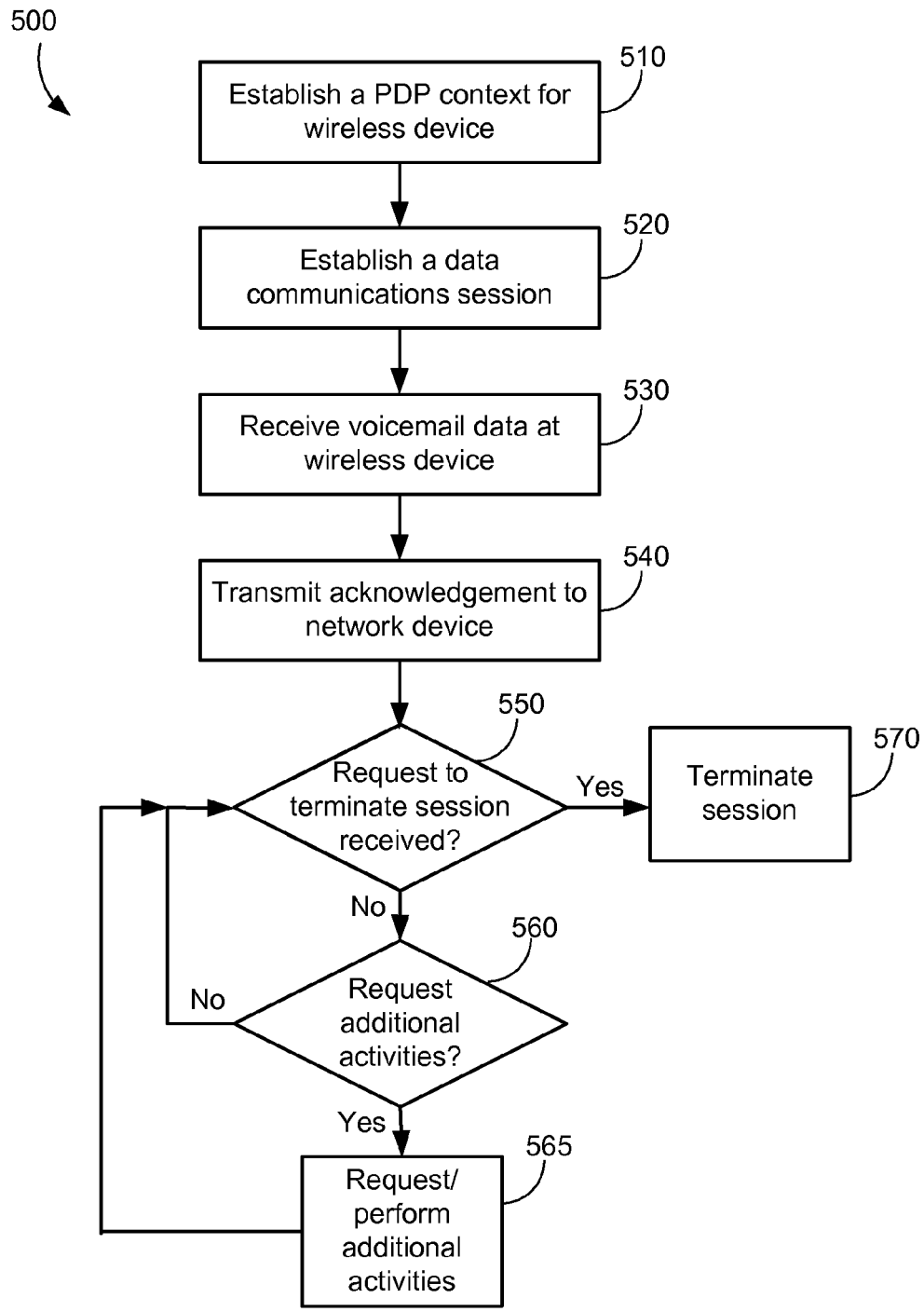
FIG. 5 illustrates another non-limiting exemplary method of implementing client management of visual voicemail data communications.

Method 500 of establishing and terminating a data communications session for communicating voicemail data according to the present disclosure for a Type C device or client is illustrated in FIG. 5. As with methods 300 and 400, method 500 may be performed by a visual voicemail client in conjunction with an operating system of a Type C device or other software and/or hardware component of a wireless device. Such a client may communication with network devices such as RNCs, SGSNs, GGSNs, and/or voicemail servers. At block 510, a request that a PDP context be established may be transmitted. Such a request may be sent to an RNC, SGSN, GGSN, or any other device configured to perform PDP context tasks. Here again, this may be due to a request transmitted from the operating system of a Type C wireless device to establish such a context, or the context establishment may be initiated by a network device. In one embodiment, the PDP context establishment request is transmitted due to the operating system of the Type C device detecting the activation of a voicemail client. The data structure containing PDP context data may be stored on any device and may contain any information as described herein with regard to FIGS. 2 and 3.

At block 520, a data communications session at the transport layer may be established as well as communications sessions at other layers, in one embodiment, between a voicemail server and the wireless device. For example, once network configuration data is established for a wireless device at block 510, such data may be used by the wireless device to request the establishment of a transmission control protocol (TCP) session between the wireless device and a voicemail server across a packet data network. Alternatively, for example when new voicemail data is available on a voicemail server for a wireless device, the voicemail server may send a request to establish a TCP session to the wireless device. Other protocols other than TCP may be used, and other devices may be involved in requesting and/or establishing a data communications session. All such embodiments are contemplated as within the scope of the present disclosure.

At block 530, voicemail data may be received at the wireless device. Such data may include any of the voicemail data described herein, including such data as disclosed in regard to FIGS. 2 and 3, and may be received and/or manipulated by any hardware and/or software elements of the wireless device.

At block 540, an acknowledgement may be transmitted from the wireless device indicating that the wireless device successfully received the voicemail data transmitted at block 530. Such an acknowledgement may be transmitted from a visual voicemail client of the wireless device. Alternatively, an indication that some or all of the voicemail data was not received successfully may be transmitted at block 540, in which case the voicemail server or network device that transmitted the voicemail data may retransmit such data.

At block 550, a determination may be made as to whether a request or command to terminate the data communications session has been received at the Type C device or client. Such a request or command may take the form of a FIN command received from a voicemail server or network device. In the interest of maximizing support for additional activities, a Type C device or client may not terminate a session until instructed to do so by a voicemail server or network device. If no request or command to terminate the session has been detected, then at block 560 a determination may be made as to whether additional activities have been or are to be requested or performed. If additional activities are to be performed or requested, the activities are performed or requested at block 565, and the method returns to block 550. Such additional activities may be any additional activities as described herein. If no additional activities are requested or performed, the determination is made again at block 550 as to whether a request or command to terminate the data communications session has been received.

If, at block 550, the determination is made by the Type C device or client that a request or command to terminate the data communications session has been received, at block 570 the Type C device or client may terminate the session. Note that at block 570, the Type C wireless device may also request that any open PDP context be closed. Such a request may be sent so an RNC, SGSN, GGSN, or any other device configured to perform PDP context tasks. The request may be communicated to the operating system of the Type C wireless device which may be configured to handle and transmit PDP context requests for activation and deactivation. Alternatively, the operating system of the Type C device may detect the request to close the transport layer communication session, the termination of the voicemail client application, or any other activity of the voicemail client that indicates that further voicemail communications are not needed. The operating system of the Type C device may then transmit the request to a network device. Such a request may be transmitted to a device separate from a voicemail server or network device that handles voicemail data, such as an RNC, SGSN or GGSN.

The methods and systems described above assist in reducing resource usage and increasing flexibility of visual voicemail systems by enabling different devices and visual voicemail clients to control the termination of data communications sessions used to communicate voicemail data. By allowing clients or user devices the ability to control the termination of data communications sessions, visual voicemail servers are then free to be configured in a single manner while enabled to deal with devices that operate in various ways. This increases the flexibility of voicemail servers in managing multiple communications sessions with various types of clients and devices. Set forth below are exemplary systems, devices, and components in which aspects of the present disclosure may be implemented.

Figure 6:
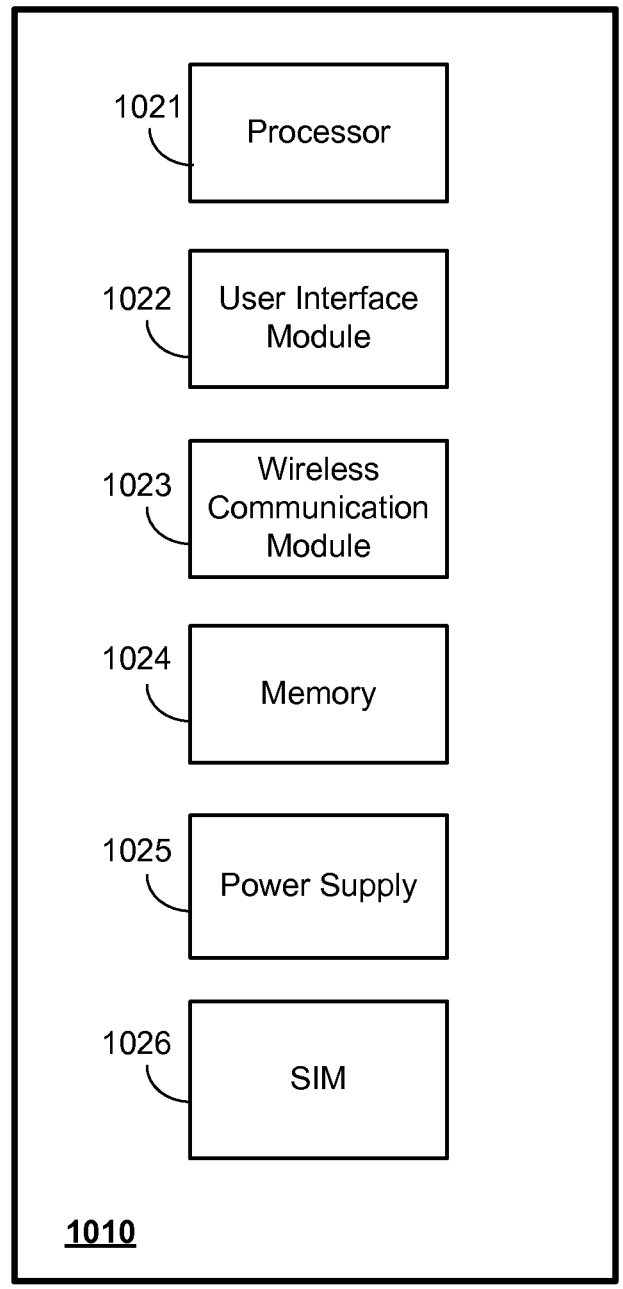
FIG. 6 is a block diagram of a non-limiting, exemplary wireless device that may be used in connection with client management of visual voicemail data communications.

FIG. 6 illustrates an example wireless device 1010 that may be used in connection with an embodiment. References will also be made to other figures of the present disclosure as appropriate. For example, wireless devices 111 and 121 may each be a wireless device of the type described in regard to FIG. 6, and may have some, all, or none of the components and modules described in regard to FIG. 6. It will be appreciated that the components and modules of wireless device 1010 illustrated in FIG. 6 are illustrative, and that any number and type of components and/or modules may be present in wireless device 1010. In addition, the functions performed by any or all of the components and modules illustrated in FIG. 6 may be performed by any number of physical components. Thus, it is possible that in some embodiments the functionality of more than one component and/or module illustrated in FIG. 6 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to visual voicemail data communications, for example. User interface module 1022 may be any type or combination of hardware and/or software that enables a user to operate and interact with wireless device 1010, and, in one embodiment, to interact with a system or software enabling the user to place, request, and/or receive calls, voicemail, voicemail notifications, voicemail data, and/or a system or software enabling the user to view, modify, or delete related software objects. For example, user interface module 1022 may include a display, physical and/or "soft" keys, voice recognition software, microphone, speaker and the like. Wireless communication module 1023 may be any type of transceiver including any combination of hardware and/or software that enables wireless device 1010 to communicate with wireless network equipment, for example, network 101, or any other type of wireless communications network or network equipment. Memory 1024 enables wireless device 1010 to store information, such as voicemail notifications, visual voicemail client software, visual voicemail data, multimedia content, software to interact with voicemail systems and network devices, and voicemail preferences. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 7:
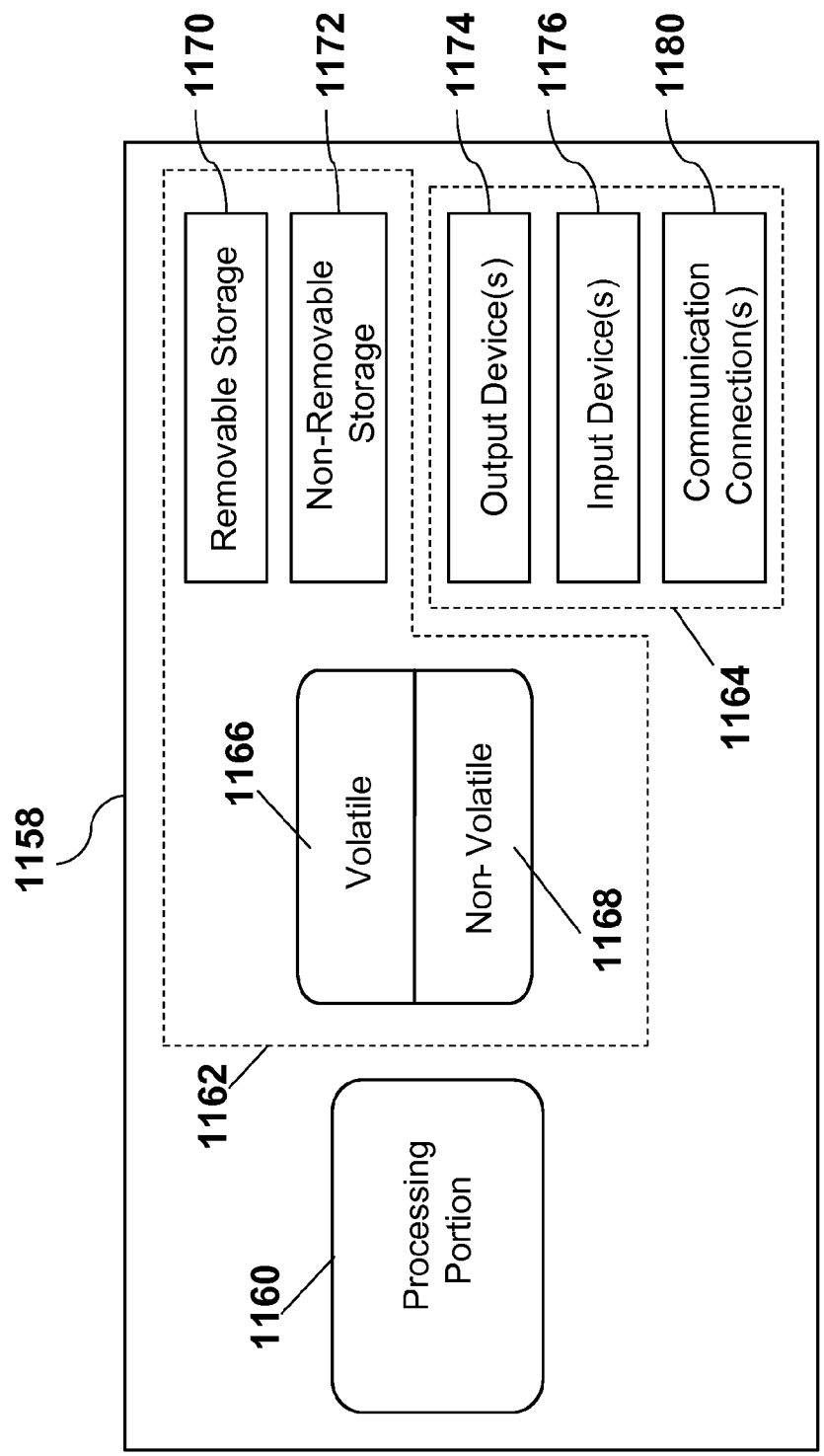
FIG. 7 is a block diagram of a non-limiting, exemplary processor in which client management of visual voicemail data communications may be implemented.

FIG. 7 is a block diagram of an example processor 1158 which may be employed in any of the embodiments described herein, including as one or more components of wireless devices 111 and 121, as one or more components of network equipment or related equipment, such as any component shown in FIG. 1, and/or as one or more components of any third party system or subsystem that may implement any portion of the subject matter described herein. It is emphasized that the block diagram depicted in FIG. 7 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 7, the processor 1158 comprises a processing portion 1160, a memory portion 1162, and an input/output portion 1164. The processing portion 1160, memory portion 1162, and input/output portion 1164 are coupled together (coupling not shown in FIG. 7) to allow communications between these portions. The input/output portion 1164 is capable of providing and/or receiving components, commands, and/or instructions, utilized to, for example, establish and terminate visual voicemail data communications, transmit and receive voicemail notifications and data, transmit, receive, store and process voicemail content, execute software to interact with voicemail systems, receive and store voicemail preferences, and/or perform any other function described herein.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing voicemail, voicemail data, calls, other telephonic communications, etc. For example, the memory portion is capable of storing voicemail preferences and/or software capable of processing call requests, operating a visual voicemail client, receiving calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through network equipment as illustrated in FIG. 1. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

The network illustrated in FIG. 1 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how visual voicemail data communications may be implemented with stationary and non-stationary network structures and architectures in order to provide integration of multimedia content with voicemail. It can be appreciated, however, that visual voicemail data communications such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for client management of visual voicemail data communications can be applied independently of the method of data transport, and do not depend on any particular network architecture, or underlying protocols.

Figure 8:
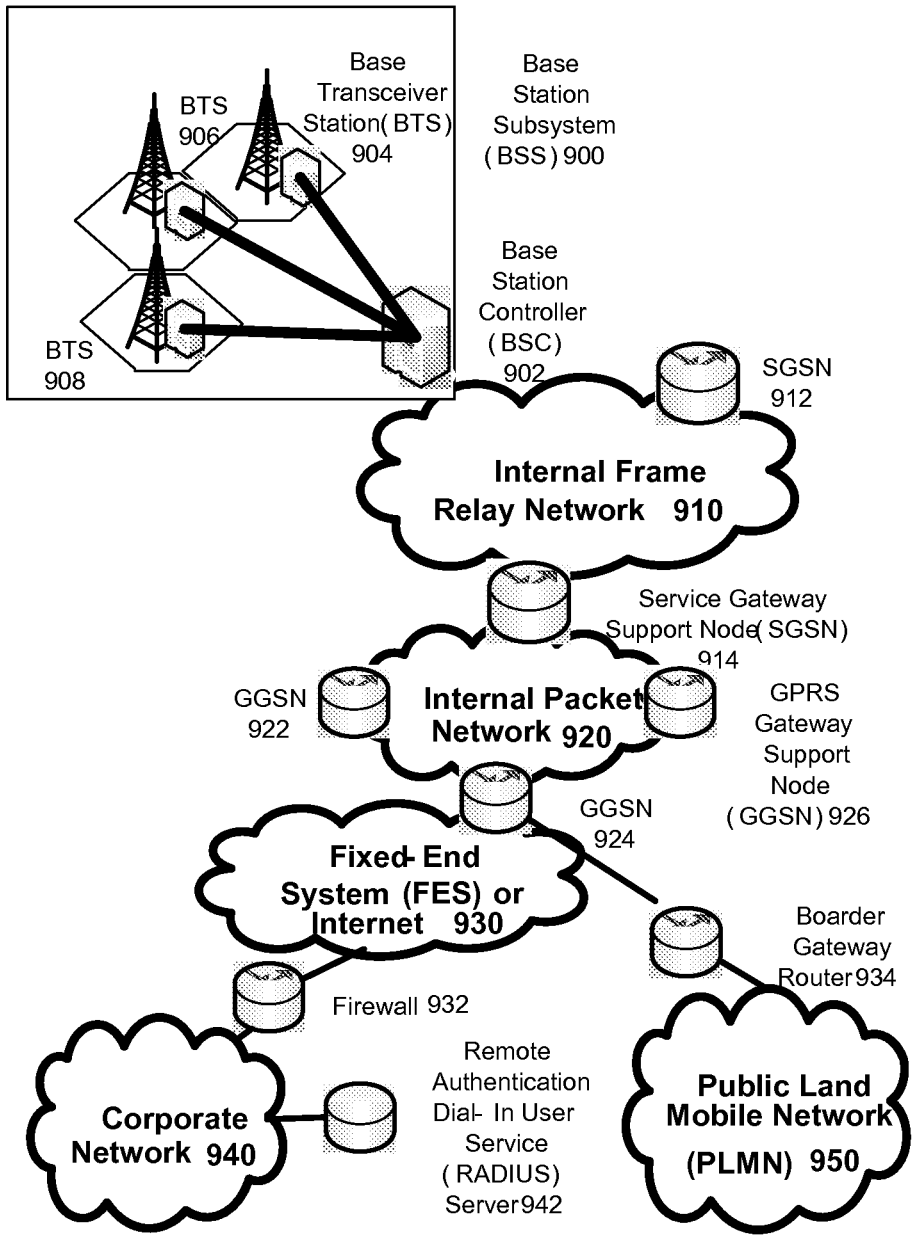
FIG. 8 is a block diagram of an exemplary packet-based mobile cellular network environment, such as a GPRS network, in which client management of visual voicemail data communications may be implemented.

FIG. 8 depicts an overall block diagram of an exemplary packet-based mobile cellular network environment, such as a GPRS network, in which the systems and methods for client management of visual voicemail data communications such as those described herein can be practiced. In an example configuration, network 101 as illustrated in FIG. 1 may be encompassed by or interact with the network environment depicted in FIG. 8. Similarly, wireless devices 111 and 121 may communicate or interact with a network environment such as that depicted in FIG. 8. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless devices 111 and 121) become connected to the wireless network. In exemplary fashion, the packet traffic originating from user devices (e.g., wireless devices 111 and 121) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 9:
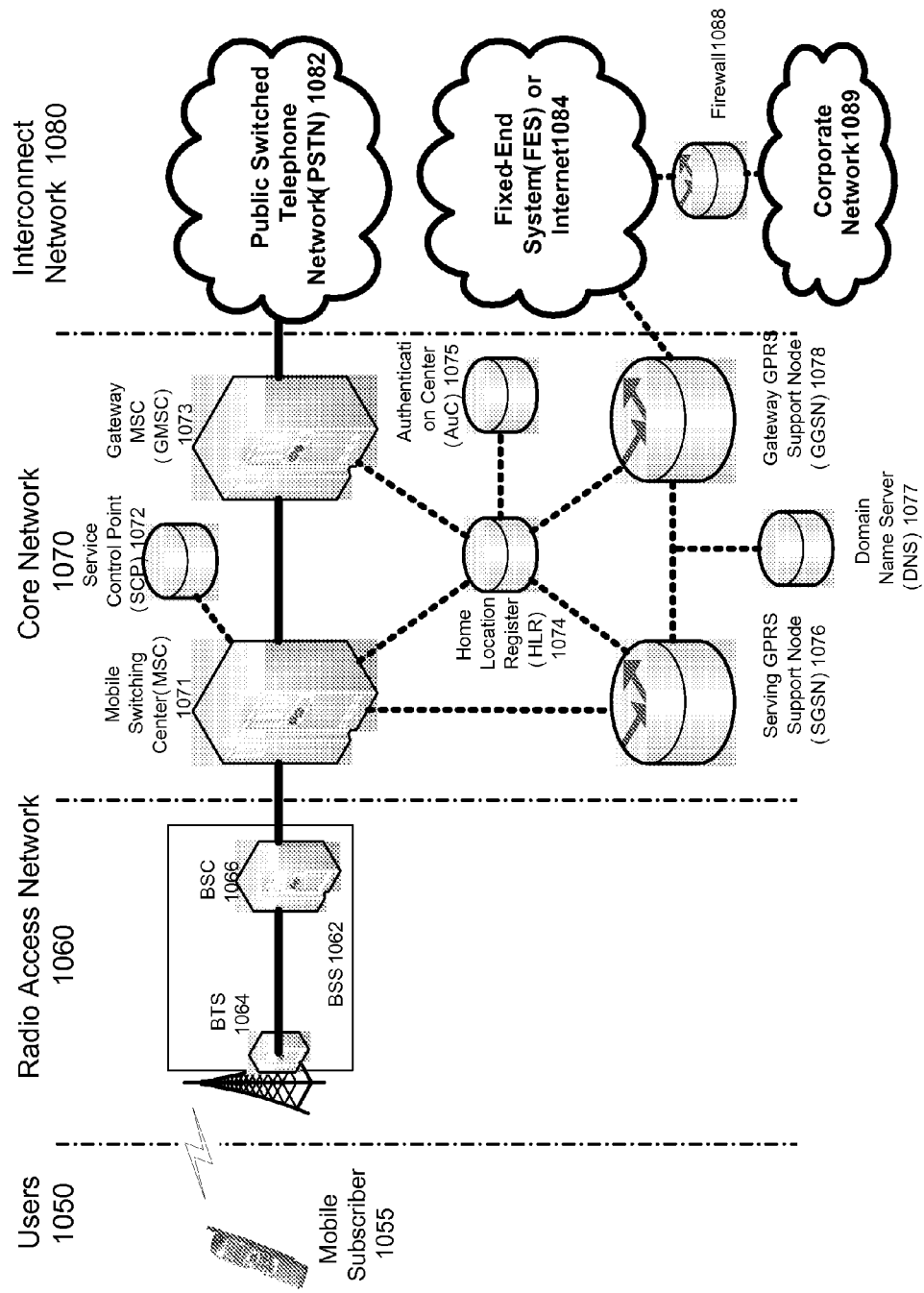
FIG. 9 illustrates a non-limiting, exemplary architecture of a typical GPRS network, segmented into four groups, in which client management of visual voicemail data communications may be implemented.

FIG. 9 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 9). In an example embodiment, the device depicted as mobile subscriber 1055 may comprise wireless devices 111 and 121. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 9, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless devices 111 or 121, used by an end user of a mobile cellular service or a wireless provider. When a mobile subscriber turns on his or her mobile device, the mobile device may go through an attach process by which the mobile device attaches to an SGSN of the GPRS network. In FIG. 9, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of client management of visual voicemail data communications such as those described herein can include but are not limited to Gateway GPRS Support Node tables, Fixed End System router tables, firewall systems, VPN tunnels, and any number of other network elements as required by the particular digital network.

Figure 10:
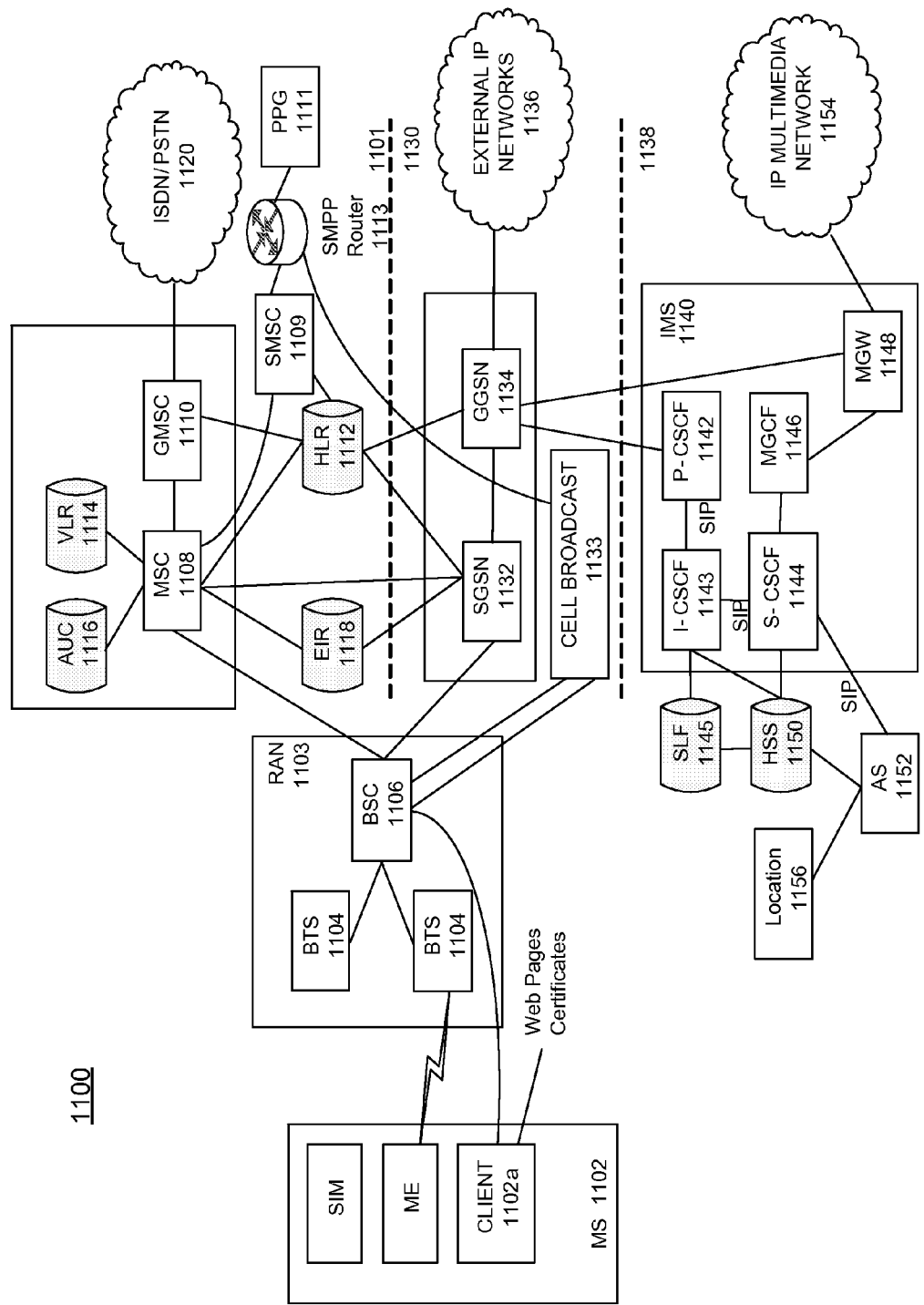
FIG. 10 illustrates a non-limiting alternate block diagram of an exemplary GSM/GPRS/IP multimedia network architecture in which client management of visual voicemail data communications may be implemented.

FIG. 10 illustrates another exemplary block diagram view of a GSM/GPRS/IP multimedia network architecture 1100 in which the systems and methods for dynamically organizing visual voicemail such as those described herein can be incorporated. As illustrated, architecture 1100 of FIG. 10 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless devices 111 and 121) that is used by mobile subscribers, in one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision is based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, does not indicate the actual physical location of the mobile telephones outside the pre-defined area.

While example embodiments of systems and methods for client management of visual voicemail data communications have been described in connection with various communications devices and computing devices/processors, the underlying concepts can be applied to any communications or computing device, processor, or system capable of implementing the client management of visual voicemail data communications systems and methods described. The various techniques described herein can be implemented in connection with hardware or software or, where appropriate, with a combination of both. Thus, the methods and apparatuses for client management of visual voicemail data communications, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for client management of visual voicemail data communications. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for client management of visual voicemail data communications can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for client management of visual voicemail data communications. When implemented on a general-purpose processor, the program code combines with the processor to provide a unique apparatus that operates to invoke the functionality of visual voicemail data communications as described herein. Additionally, any storage techniques used in connection with a visual voicemail system can invariably be a combination of hardware and software.

While client management of visual voicemail data communications has been described in connection with the various embodiments of the various figures, it is to be understood that other similar embodiments can be used or modifications and additions can be made to the described embodiment for performing the same function of client management of visual voicemail data communications without deviating therefrom. For example, one skilled in the art will recognize that client management of visual voicemail data communications as described in the present application may apply to any environment, whether wired or wireless, and may be applied to any number of such devices connected via a communications network and interacting across the network. Therefore, client management of visual voicemail data communications should not be limited to any single embodiment, but rather should be construed in breadth and scope in accordance with the appended claims.

What is claimed is:

1. A tangible computer-readable storage medium that is not a transitory propagating signal, the tangible computer-readable storage medium comprising computer-executable instructions, which when executed by a processor, cause the processor to effectuate operations comprising:
   establishing a data communications session between a visual voicemail server and a wireless device;
   receiving at the wireless device visual voicemail data from the visual voicemail server;
   transmitting an acknowledgment of receipt of the visual voicemail data from the wireless device to the visual voicemail server;
   responsive to receiving the visual voicemail data from the visual voicemail server, setting a timer;
   detecting a command to manipulate second visual voicemail data;
   responsive to detecting the command to manipulate the second visual voicemail data, transmitting a request to manipulate the second visual voicemail to the visual voicemail server;

resetting the timer upon transmitting the request to manipulate the second visual voicemail;

before detecting an expiration of the timer, detecting a request to terminate the data communications session; and responsive to detecting the request to terminate the data communications session, transmitting a command to terminate the data communications session from the wireless device to the visual voicemail server.

2. The tangible computer-readable storage medium of claim 1, wherein the operations further comprise establishing a packet data protocol context for the wireless device.

3. The tangible computer-readable storage medium of claim 1, wherein the wireless device is configured with a visual voicemail client.

4. The tangible computer-readable storage medium of claim 1, wherein the command to terminate the data communications session is a TCP FIN command.

5. The tangible computer-readable storage medium of claim 1, wherein the operation of transmitting the command to terminate the data communications session is performed immediately following the operation of detecting the request to terminate the data communications session.

6. The tangible computer-readable storage medium of claim 1, wherein the operations further comprise transmitting a request for additional activities to the visual voicemail server.

7. The tangible computer-readable storage medium of claim 6, wherein the operations further comprise resetting the timer upon transmitting the request for additional activities.

8. A method comprising:
establishing a data communications session between a visual voicemail server and a wireless device;

receiving, on the wireless device, visual voicemail data from the visual voicemail server;

transmitting an acknowledgment of receipt of the visual voicemail data from the wireless device to the visual voicemail server;

responsive to receiving the visual voicemail data from the visual voicemail server, setting a timer on the wireless device;

detecting, on the wireless device, a command to manipulate second visual voicemail data;

responsive to detecting the command to manipulate the second visual voicemail data, transmitting a request to manipulate the second visual voicemail data from the wireless device to the visual voicemail server;

resetting the timer upon transmitting the request to manipulate the second visual voicemail data;

before detecting an expiration of the timer, detecting, on the wireless device, a request to terminate the data communications session; and responsive to detecting the request to terminate the data communications session, transmitting a command to terminate the data communications session from the wireless device to the visual voicemail server.

9. The method of claim 8, further comprising establishing a packet data protocol context for the wireless device.

10. The method of claim 8, wherein the wireless device is configured with a visual voicemail client.

11. The method of claim 8, wherein the command to terminate the data communications session is a TCP FIN command.

12. The method of claim 8, further comprising transmitting a request for additional activities from the wireless device to the visual voicemail server.

13. The method of claim 12, further comprising resetting the timer upon transmitting the request for additional activities.

14. A wireless device comprising:
a memory comprising executable instructions; and
a processor coupled to the memory that, when executing the instructions, effectuates operations comprising:
establishing a data communications session between a visual voicemail server and the wireless device;

receiving visual voicemail data from the visual voicemail server;

transmitting an acknowledgment of receipt of the visual voicemail data;

responsive to receiving the visual voicemail data from the visual voicemail server, setting a timer;

detecting a command to manipulate second visual voicemail data;

responsive to detecting the command to manipulate the second visual voicemail data, transmitting a request to manipulate the second visual voicemail to the visual voicemail server;

resetting the timer upon transmitting the request to manipulate the second visual voicemail;

before detecting an expiration of the timer, detecting a request to terminate the data communications session; and responsive to detecting the request to terminate the data communications session, transmitting a command to terminate the data communications session.

15. The wireless device of claim 14, wherein the operations further comprise establishing a packet data protocol context.

16. The wireless device of claim 14, wherein the operations further comprise executing a visual voicemail client.

17. The wireless device of claim 14, wherein the operation of transmitting the command to terminate the data communications session is performed immediately following the operation of detecting the request to terminate the data communications session.

18. The wireless device of claim 14, wherein the command to terminate the data communications session comprises a TCP FIN command.

19. The wireless device of claim 14, wherein the operations further comprise transmitting a request for additional activities.

20. The wireless device of claim 19, wherein the operations further comprise resetting the time upon transmitting the request for additional activities.

* * * * *